Patented Aug. 12, 1930

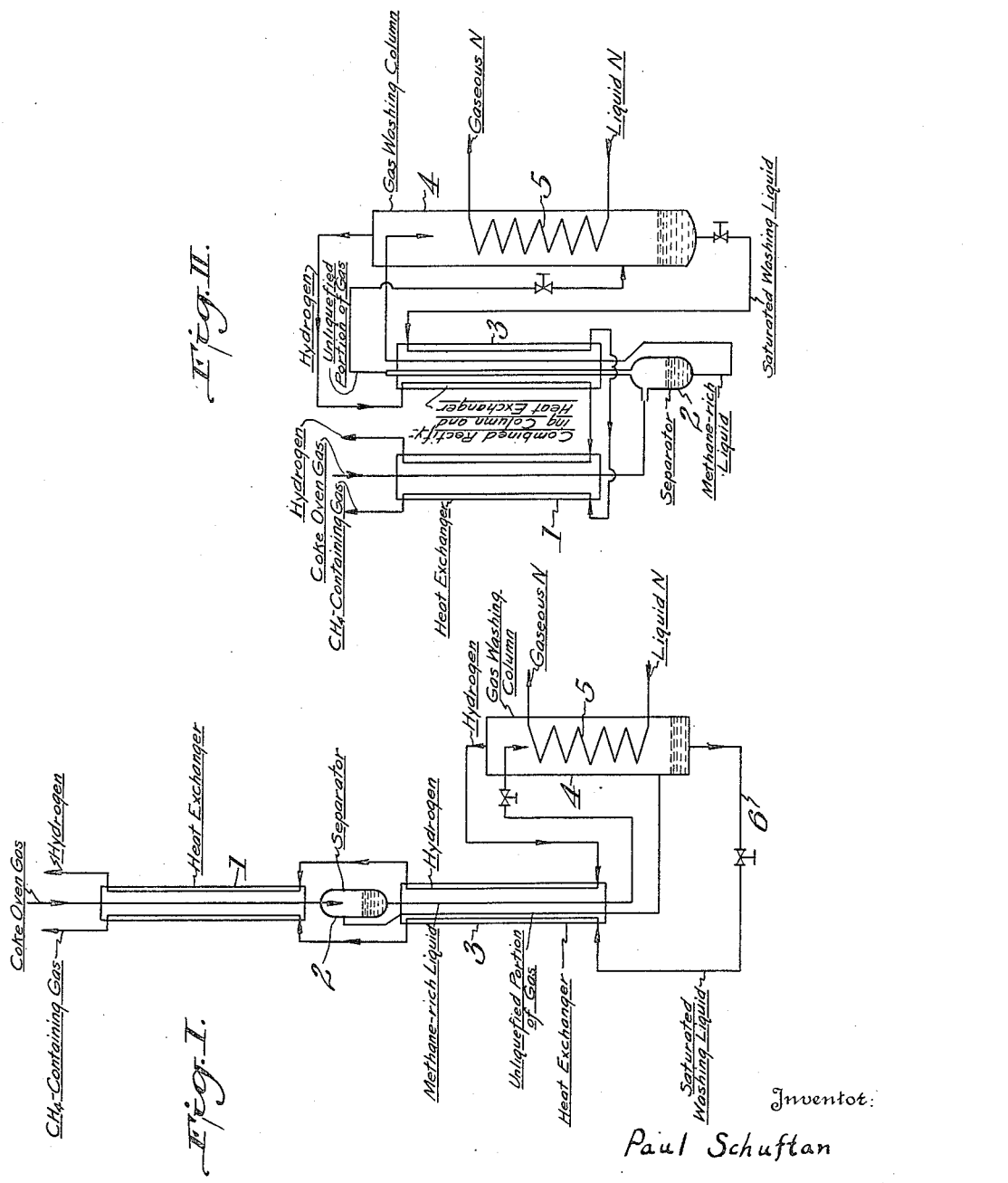

1,773,012

UNITED STATES PATENT OFFICE

PAUL SCHUFTAN, OF HOLLRIEGELSKREUTH, NEAR MUNICH, GERMANY, ASSIGNOR TO GESELLSCHAFT FÜR LINDE'S EISMASCHINEN, A. G., OF HOLLRIEGELSKREUTH, NEAR MUNICH, GERMANY, A CORPORATION OF GERMANY

PROCESS FOR THE SEPARATION OF GAS MIXTURES

Application filed July 9, 1928, Serial No. 291,259, and in Germany July 27, 1927.

The present invention relates to a process for the separation of gas mixtures into their components and particularly to such a process wherein the condensate obtained by preliminarily cooling the gases is further cooled and used as a washing liquid for the solution of other components of the unliquefied portion of the gases with simultaneous removal of heat.

In order to obtain a substantially complete separation of a gas mixture by fractional condensation under pressure, it is necessary to decrease the temperature so far that the saturation vapor pressure of the components to be removed from the gas will be very small. If, for instance, technically pure hydrogen is to be obtained from coke oven gas, the temperature must be lowered to below $-200°$ C. in order to repress the content of nitrogen, carbon monoxide and methane in the gas, to less than 3%. Working at such low temperatures causes, however, well-known difficulties (e. g., condensation of the air on the cold parts) and consumes relatively large amounts of energy.

The present invention makes it possible to obtain the same results as to purity even at higher temperatures; the new process depends upon the solubility of the components to be removed from the gas, in liquids which have been obtained by condensation out of the gas at higher temperatures and have been thereafter further cooled.

For purposes of illustration the process as applied to the production of hydrogen from coke oven gas will now be described with reference to the accompanying drawing, of which Fig. 1 is a schematic representation of one method of carrying out the invention; and Fig. 2 is a schematic representation of a modified form of the process of the invention.

The gas to be separated is freed in the usual manner from sulfur compounds, carbon dioxide and moisture, and is cooled under pressure in counter-current exchange with the separation products in heat interchanger 1 of Figure 1. Here ethylene liquefies first, together with the higher hydrocarbons contained in the gas, and at a lower temperature, the methane, together with more or less carbon monoxide and nitrogen. This liquid is separated from the unliquefied portion of the gas in separator 2 and is then separately cooled to a low temperature in heat exchanger 3. In order to compensate for the losses caused by incomplete heat exchange of the gases, and by radiation from the surroundings, an additional cooling at the lowest temperature is carried out, for instance, with liquid nitrogen, which boils nearly under atmospheric pressure in coil 5. The partial pressures of carbon monoxide and nitrogen are still so high at this temperature that, with a total pressure during separation of about 20 atmospheres a higher purity of hydrogen than about 88% is not attainable because of the increase in vapor concentration caused by compression. It has now been found that the partial pressure of the impurities may be decreased by about three-fourths if the gas is brought into contact with the previously separated methane-rich liquid at the given temperature, and the latter is used as a solvent for the components to be removed. For this purpose the methane-rich liquid separated in separator 2 is brought into thorough contact with the gas in the washing apparatus 4 after cooling in the counter-current cooler 3.

Since the partial pressures of carbon monoxide and nitrogen increase over the methane solution as the solution becomes richer in them, in order to obtain a high purity of hydrogen it is advantageous to use counter-current washing. Therefore, the liquid is introduced at the top of washing column 4 and flows in fine subdivision counter-current to the gas entering at the bottom. The gas coming from the top of the column then contains only such an amount of impurities as corresponds with the low content thereof in the liquid entering at the top, while the washing liquid removed at the bottom may contain a considerably higher amount of impurities.

The heat of condensation or solution liberated by the separation of carbon monoxide and nitrogen out of the gases in the washing column must be removed. For this purpose cooling coil 5 is provided which, for example, is fed with boiling nitrogen.

The hydrogen coming out of the top of the column is returned through heat exchangers 3 and 1; the liquid collecting at the bottom is advantageously expanded nearly to atmospheric pressure through valve 6 and likewise utilized in heat exchangers 3 and 1 the heat of vaporization as well as the sensible heat being transferred to the gases to be cooled. It may be advisable in some cases to provide special vaporizing apparatus for the utilization of the heat of vaporization of the washing liquid, which is heated by the gases to be separated before they pass into column 4, or by an auxiliary material (e. g., nitrogen). The cold of the expanded liquid can also be utilized in the washing column 4 for removing the heat of condensation and solution and for this purpose the liquid is caused to flow through coil 5 in place of the liquid nitrogen.

The content of carbon monoxide and nitrogen in the methane-rich liquid used for washing can be considerably decreased by a pretreatment of this liquid in a rectification column under pressure. For this purpose the condensation of the methane-rich liquid may be effected in a condenser with reflux and rectification as represented in Figure 2. The heat interchanger 1 of this figure takes the place of the upper part of the interchanger 1 in Fig. 1. The compressed coke oven gas precooled in this interchanger enters the interchanger 3 corresponding to the lower part of interchanger 1 and to interchanger 3 of Fig. 1. The coke oven gas flows in upward direction, the methane-rich liquid condensed by cooling is flowing downward. It comes hereby in regions of increasing temperature in direct contact with the coke oven gas, the effect of which is that components of lower boiling points (nitrogen, carbon monoxide etc.) are replaced by methane, a liquid of higher methane percentage being produced than by the process represented by Fig. 1. If this methane-rich liquid obtained in this way is used for the washing, an increase in the purity of the hydrogen is obtained, or the same purification effect can be obtained at a higher temperature, so that, for instance, the use of nitrogen as a cooling means may be entirely avoided.

The effect of the washing is the greater the lower the temperature is. The solidification effect of the washing liquid establishes the lower limit for the temperature. For pure methane this point is 90° absolute. The higher the content of carbon monoxide and nitrogen in the wash liquid, the more its freezing point is decreased. In order, however, to be able to utilize the particularly high washing effect at low temperatures when methane-rich washing liquids are used, less volatile materials are added to the condensate (e. g., methane) used as a washing means in this process in order to depress its freezing point. In the present example the ethylene separated at higher temperature may be used for this purpose and in this way a lowering of 12° in the freezing point may be effected. In a similar way the process can be applied to other gas mixtures; thus, for instance, from water gas a mixture of hydrogen and carbon monoxide of definite concentration, freed from oxygen and nitrogen, can be produced by subjecting the water gas, compressed to a suitable pressure, and after cooling, to washing with liquid carbon monoxide, whereby simultaneously a complete removal of methane, as well as all impurities acting as catalyst poisons, is effected.

I claim:

1. Process for the separation of gas mixtures into their components which comprises preliminarily cooling a gas mixture until at least one component liquefies, further cooling the liquid portion and thereafter dissolving further components out of the gaseous portion by bringing the cooled liquid portion into contact with the gaseous portion with simultaneous removal of heat.

2. Process for the separation of gas mixtures into their components which comprises preliminarily cooling a gas mixture until at least one component liquefies, further cooling the liquid portion and thereafter dissolving further components out of the gaseous portion by bringing the cooled liquid portion into counter-current contact with the gaseous portion with simultaneous removal of heat.

3. Process for the separation of gas mixtures into their components which comprises preliminarily cooling a gas mixture until at least one component liquefies, freeing the liquid portion from lower boiling components by rectification, further cooling it and thereafter dissolving further components out of the gaseous portion by bringing the cooled liquid portion into counter-current contact with the gaseous portion with simultaneous removal of heat.

4. A process as defined in claim 1 wherein the liquid portion used for washing the gaseous portion comprises a mixture of several components of the original gas, the freezing point of said mixture being lower than that of the single components.

In testimony whereof, I affix my signature.

PAUL SCHUFTAN.